United States Patent

[11] 3,588,845

[72] Inventor Andrew T. Ling
Palos Verdes Peninsula, Calif.
[21] Appl. No. 759,815
[22] Filed Sept. 9, 1968
[45] Patented June 28, 1971
[73] Assignee Compagnie Internationale Pour L'Informatique
Les Clayes sous, Bois, France

[54] ASSOCIATIVE MEMORY
17 Claims, 2 Drawing Figs.

[52] U.S. Cl. .......... 340/173, 340/172.5
[51] Int. Cl. .......... G11c 7/00, G11c 15/00
[50] Field of Search .......... 340/172.5, 173, 173 (AM)

[56] References Cited

UNITED STATES PATENTS

| | | | |
|---|---|---|---|
| 3,292,159 | 12/1966 | Koerner | 340/172.5 |
| 3,339,181 | 8/1967 | Singleton | 340/172.5 |
| 3,353,159 | 11/1967 | Lee | 340/172.5 |
| 3,483,530 | 12/1969 | Furman | 340/173 |

*Primary Examiner*—Terrell W. Fears
*Attorney*—Smyth, Roston and Pavitt

ABSTRACT: An associative memory is disclosed composed of modules each having a plurality of storage cells selectively operable as data bit cells or associative search bit cells. The associative memory is organized in rows and columns. The cells on each column are connected to a data record control line being raised, if the bit in the accompanying bit value line is to be recorded in a cell on the column. A third line of the column is a search select line to identify a bit in the bit value line as search criterion. Cells in a row are connected to a line which provides an enabling signal if all cells on columns, whose search line have been raised, hold bits which agree with the bits in the corresponding bit value line; or have been externally addressed. A priority system among these row lines inhibits multiple word addressing. Data are taken from output lines along the columns.

Figure 1:
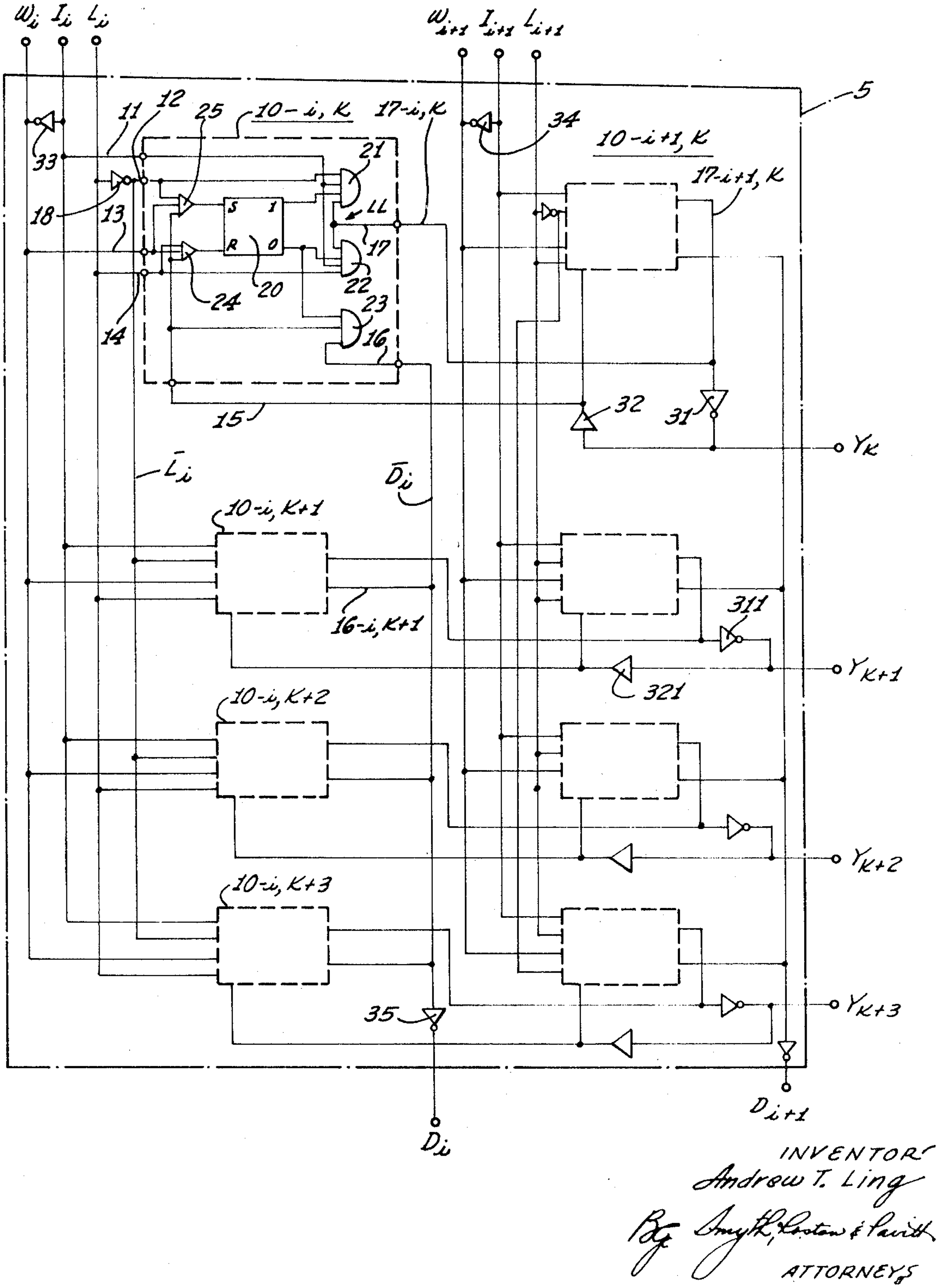

INVENTOR
Andrew T. Ling
By Smyth, Roston & Pavitt
ATTORNEYS

INVENTOR
Andrew T. Ling
By Smyth, Roston & Pavitt
ATTORNEYS

ASSOCIATIVE MEMORY

The present invention relates to an associative memory. Associative memories are usually constructed in the following manner. A memory is provided in which each word location of the memory proper is addressable in accordance with a prewired, fixed addressing and decoding scheme. Associated with the addressing control of the memory is an address translator device in which associative addresses, externally provided, are translated into memory addresses, and the translator device then controls addressing of individual locations in the memory proper through the hard wired addressing control and decoding system thereof.

The associative memory, in accordance with the present invention, is constructed from modules which permit much greater flexibility. Individual multibit-position memory locations are defined as such through hard wiring and they each have a particular number of bit storage locations, but they do not have to have any fixed address code identification. The term "memory location" will be used in the following to define a plurality of individual bit locations, the content of at least one of them serving associatively to define an address code or subcode for the entire location. There is a common control link between cells which establishes the association of bit cells and defines therewith a complete memory location. That association of cells is hard wired into the system. Each bit cell can selectively serve as store of an address defining bit or as store for a data bit, whereby interpretation of the content of a bit location is a matter of control and usage at any instant, not of preassignment. The usage of any cell in a particular manner is not hard wired, but subjected to control signals applied to the module to which the cell pertains. This does not preclude the possibility that in operation and within a particular memory system, any particular bit location may always hold a data bit, while other bit locations always or usually hold an address bit or a control bit.

The bit locations are organized in modules which are constructed to permit this selectivity of employment of the individual cells. External connections of the modules and module interconnections are made to accommodate the system to the desired format of a memory location. The modules are constructed so that each module holds storage cells for a plurality of bits; among these cells one or more pertain to the same memory location and one or more cells pertain to different memory locations. The modules are further constructed in that each bit cell has an output circuit connected twofold to all the output circuits of the cells pertaining to the same memory location. The modules can, in fact, be constructed so that all of the cells of a module are in one integrated circuit chip. Bit cells defining similar bit positions of different memory locations are interconnected by common information input and output lines to provide a receive search and data bits. The input lines include record control, search select and bit value input lines. The output lines are data read output lines. The memory matrix will be organized in rows and columns of cells. All cells on a row define a single storage location and the addressing lines for the locations thus are associated with the rows of the matrix. The other input and output lines are then individually associated with the columns on the matrix. For an associative search, control bits are applied to particular search select lines and the associated bit-value lines receive associative search bits as search criteria. The content of the addressed memory location can then be taken from the data output lines. The same location can be recorded into through raising the record control lines and applying data bits to the corresponding bit value input lines.

Whenever a cell participates in an associative search in that for the purpose of that search it holds an address bit, the output circuit of that particular cell will prevent enabling of data input and output circuits of all cells of the same location for data recording or readout, if the search bit concurrently applied to all cells having the same bit position in the different locations does not coincide with the bit the cell holds. If none of the output circuits of a memory location provides a disabling signal, the data input and output circuits of that location are enabled. For readout, the output circuits provide the respective data bits. For recording, the input circuits cause selective recording of data into the cells of that memory location. This enabling will particularly control through all cells of the location by not providing a disabling signal either because the search criteria applied to a cell agrees with the content thereof or because of nonparticipation in the associative search.

In case more than one memory location responds to a particular associative search, a priority control causes the selection of but one location on a hard wired priority basis. The system becomes self-addressible through control operations if a particular bit position in each memory location defines the state of occupancy of that location. In cooperation with the priority control, the memory can be filled with information by using first the "empty" condition as an associative search criteria, and by loading empty locations in accordance with the hard wired priority. The loaded information then includes bits defining later on, the associative address for a higher level search.

Figure 2:
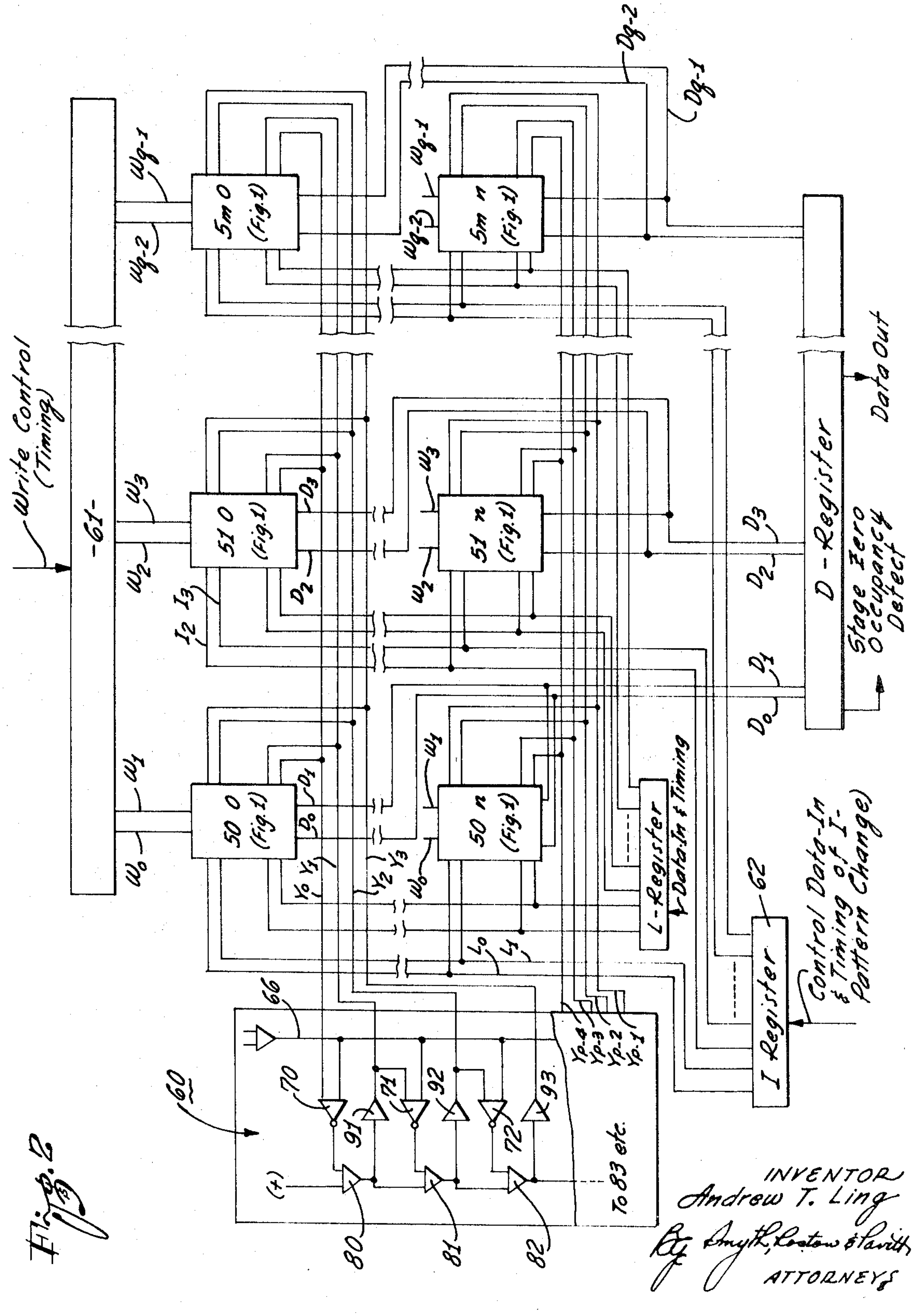

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates a circuit diagram (partially as block diagram) for an associative memory module in accordance with the preferred embodiment of the invention; and FIG. 2 illustrates a block diagram for an associative memory with control circuit and constructed from modules as shown in FIG. 1.

GENERAL DESCRIPTION OF MEMORY MODULE

Proceeding now to the detailed description of the drawings, reference numeral 10 in FIG. 1 denotes, in general, single bit storage cells of a module 5 for an associative memory constructed in accordance with the present invention. Each cell is, furthermore, identified by a pair of character indices, defining representatively coordinates of a matrix point of a memory matrix of which these cells are components. One of the eight cells of module 5 is illustrated in greater detail. This particular cell is identified as 10–*i,k:* it is the cell in column *i*, row *k* of the memory matrix.

The eight cells of module 5 constitute what can also be described as submatrix or an elemental memory matrix of which larger memory matrices are composed. The eight cells of the submatrix are organized in two columns, denoted *i* and *i*+1 and four rows *k*, *k*+1, *k*+2, *k*+3 respectively. Accordingly, the smallest memory which can be constructed with such modules is one, employing only a single module. A memory constructed from modules of this type is further organized in that all cells on one row *k* define a single memory location. The index *i* defines a bit position within that memory location, and all cells on column *i*, have the same bit position in the respective memory locations to which they pertain.

The memory matrix in general, and the module illustrated in particular, has three input lines for each column, such as $W_i$, $I_i$ and $L_i$ and one output line $D_i$. Additional lines such as $Y_k$, $Y_{k+1}$, etc. serve selectively as input and output lines along the rows of the matrix. $W_i$ is the write or record control line which, when raised, causes a bit to be recorded into at least one cell of column *i*. $I_i$ is the associative search line which, when raised, indicates that for the current associative search bit position *i* of the memory locations is regarded as holding an address bit. $L_i$ is the bit value input line. When $W_i$ is raised concurrently, the bit applied to $L_i$ is a data bit to be recorded; if $I_i$ is raised, the bit in $L_i$ defines an associative search bit, and the search looks for a cell along column *i* having a bit equal to the bit value provided by $L_i$. Output line $D_i$ permits withdrawal of a bit of an addressed bit location in column *i*.

Each row has a single control line for addressing such as $Y_k$ operating as an input as well as an output line for all cells on that line. Thus, each matrix point is served by five lines, to be explained in detail below. Due to intramodule-extracell signal processing and, as will be described next, two additional connecting lines are required for each cell, so that each memory cell is connected to seven connecting lines.

STORAGE CELL CONSTRUCTION

After these more general remarks, the description will proceed to cover first an individual storage cell within the module structure and an example for a larger memory matrix will be discussed in later chapters. There are five input lines 11, 12, 13, 14 and 15 respectively, for the particular cell 10–*i,k* and two output lines, 16 and 17. The input lines 11, 13 and 14 connect to the input buses $I_i$, $W_i$, and $L_i$ for the column *i*. Line 12 connects to bus $L_i$ through an inverter 18. The output line connected to inverter 18 is appropriately designated $\overline{L}_i$ and input line 12 of the cell 10–*i,k* is connected to line $\overline{L}_i$, accordingly. Line 15 connects to the control line $Y_k$ for row K through an amplifier 32. Output line 17 connects to line $Y_k$ through an inverter 31 and output line 16 connects to the data output line $\overline{D}_i$ of the module which, in turn, connects to the data output line $D_i$ of the memory matrix.

The central element of each memory storage cell is a bistable device, such as a flip-flop 20 which, in effect, can be a simple set-reset type flip-flop. The flip-flop 20 is, of course, at any time, either in the set or in the reset state, and it is presumed that these states respectively denote bivalued bits 1 or 0. The flip-flop 20 has an output circuit which includes three AND gates 21, 22 and 23, and an input circuit which includes NAND gates 24 and 25. The circuit connections are made as follows.

AND gate 21 is connected to receive the set side output of flip-flop 20 as one of its altogether three input signals. The two other input terminals of gate 21 connect to input lines 11 and 12. AND gates 22 and 23 both receive the reset side output of the flip-flop 20, in addition to other signals. Particularly AND gate 22 connects to cell input lines 11 and 14, and AND gate 23 is connected to input lines 15. Gates 21 and 22 are interconnected in an AND/OR configuration operation as an exclusive OR connection to output line 17. These two gates are enabled during an associative search and compare the bit applied to column *i* (via line $L_i$) with the state of flip-flop 20. Gate 23 connects to output line 16. Thus, gate 23 provides a signal representative of the state of flip-flop to lien 16, when the particular cell is addressed through line 15 (which is connected to addressing line $Y_k$).

NAND gate 25 controls the set side input of flip-flop 20 and is connected with its three input terminals to input lines 12, 13 and 15. NAND gate 24 controls the reset side input of the flip-flop and is connected with its three input terminals to input lines 13, 14 and 15. The NAND gates thus cause the flip-flop to set or reset when line $W_i$ is raised and when the memory location *k* (i.e., all cells on line $Y_k$) is addressed.

ASSOCIATIVE SEARCH AND READOUT

In accordance with the basic concept of the invention, each storage cell can play dual parts. The bit in the *i*th bit position of the *k*th memory location may define an associative address bit or a data bit, whereby the interpretation is not inherent in the identity of the location or of the bit but is a matter of control. Assuming that the particular cell 10–*i,k* participates in an associative search, then its content will be interpreted as an associative address bit to be interrogated pursuant to an associative search.

An interrogating signal will be applied to the module input line $I_i$, which is connected to input line 11 of the cell. In general, whether or not the *i*th matrix column and the *i*th bit position participates in the associative search is indicated by raising line $I_i$. Accordingly, enabling signals are applied to the two AND gates 21 and 22. Shortly thereafter, allowing particularly for setting of signals in these gates, a bit-value defining signal is applied to the module input line $L_i$, to which is connected input line 14 of the cell. Inverter 18 provided as part of the extracell-intramodule circuitry establishes a signal which is the complement of the signal in line $L_i$.

It is apparent that if the state of flip-flop 20 coincides with the bit applied to line $L_i$, neither one of the AND gates 21 and 22 responds to produce a true output. Hence, line 17 receives a false signal if the bit applied to line $L_i$ coincides with the bit stored in the flip-flop 20. Line 17 receives also a false signal, if the cell 10–*i,k* does not participate in the associative search, because then a false signal in line $I_i$ clamps gates 21 and 22 to the false level.

The output of gate 21 or the output of gate 22 turn true in case the value of the bit applied to line $L_i$ does not coincide with the value of the bit stored in flip-flop 20; the signal in output line 17 will turn true accordingly. AND gates 21 and 22, of course, can never be both true, because the flip-flop is only in one state or the other, so that indeed, the connection is analogous to an exclusive OR gate.

The line 17 connects, through inverter 31, to the addressing line $Y_k$ for the one memory location 10–*i,k* as one of its cells. Considering this line $Y_k$ for a moment, one can see that inverter 31 has its input additionally connected to the output line of the second bit cell on this line $Y_k$ denoted with 10–*i*+1,*k*. The exclusive OR connection is continued at the input side of inverter 31 so that the output of inverter 31 will turn true only if the two input lines 17–*i,k* and 17–*i*+1,*k* both hold false signals. In all other situations inverter 31 clamps line $Y_k$ to the false signal level.

The inverted outputs of the corresponding lines 17 of all cells along row *k* are coupled similarly to line $Y_k$. A cell not participating in the associative search has its AND/OR configuration 21—22 disabled as the respective I line has not been raised and holds a false signal. It is significant that the output signals provided by the several AND/OR configurations such as 21—22 of cell 10–*i,k* and others is the same (namely, as false signal) in case a search address bit agrees with a stored bit and in case a cell does not participate at all in the associated search (because it holds a data bit). Thus, in case all of the several lines 17 coupled through inverters (such as 31) to line $Y_k$ have false outputs, either because of agreement between respective search bit and stored bit, or because a cell does not participate in the associative search, line $Y_k$ turns true. On the other hand, if any of the cells connected to line $Y_k$, for example, cell 10–*i,k* holds a bit different from the search bit applied to the respective L line, here the L line for the *i*th column, line $L_i$, AND/OR gate 21—22 provides a true signal to inverter 31 and its output is, therefore, false, holding like $Y_k$ down to the false signal level, regardless of any attempt of any inverter on line $Y_k$ to provide thereto a true signal. Also the output of inverter 31 will go false when line 17 goes true, regardless of the concurrently provided signal in line 17–*i*+1,*k*. Thus, as soon as one of the inverters, such as 31, on line $Y_k$, turns False, line $Y_k$ is, in fact, clamped to the false signal level regardless of the other inputs it may receive. In this case, the memory location on line $Y_k$ is not elected in the associative search.

Having established, as an assumed condition, that line $Y_k$ does receive true signals only, and thus stays true, that signal is amplified in an amplifier 32 which is also part of module 5. Line 15 connects to and receives the output of amplifier 32 and provides the addressing input control for the particular cell 10–*i,k*. In particular then, the output of amplifier 32 connects through input line 15 of cell 10–*i,k* to data output gate 23 thereof. As was mentioned above, the gate 23 receives the reset output side signal of flip-flop 20. Therefore, a true (false) signal is applied by gate 23 to data output line 16 of the cell in case flip-flop 20 is in the reset (set) state. The output line 16 connects to the intramodule data line $\overline{D}_i$ for matrix column *i* therein, and the inverter 35 introduced above couples line $\overline{D}_i$ to data output line $D_i$. Therefore, line $D_i$ receives a true signal for a "1" read from flip-flop 20 and a false signal for a "0."

Concurrently to the operation described in the preceeding paragraph, all memory cells connected to the addressing line $Y_k$ will provide there bits to their respective data column output line to which they are connected. Consider cell 10–$i$+1,$k$ and assuming that this cell did not participate in the associative search, it still receives the true signal in line $Y_k$ through amplifier 32, and thus its data output gate (corresponding to gate 23) is enabled to provide the content of the flip-flop of cell 10–$i$+1,$k$ to the date output line to which it is connected, namely, $D_{i+1}$. To restate this latter operation in general terms, the output gate of the respective bit cell flip-flop when receiving a true signal through its particular addressing input line (such as 15), will provide a bit-defining output signal to the respective data output line D, regardless of whether or not that particular flip-flop was addressed during the preceding associative search, as long as the respective memory location has responded affirmatively to the associative search. Line $Y_k$ could also hold a true signal even if none of its cells have been interrogated. This permits a readout of all cells on line $Y_k$, provided concurrently line $Y_{k+1}$, $Y_{k+2}$, etc., are externally clamped to the false level. This case will be dealt with more fully below when systems configurations are discussed.

MEMORY RECORDING

For recording of data in the particular cell, the input circuit of that cell is utilized as follows: considering again cell 10–$i$,$k$, it is required that the write or record addressing wire $W_i$ for the $i$th column of the matrix be raised by a true signal. This enabling signal is fed through the line 13 as true inputs to each of the two NAND gates 24 and 25. Additionally, the row addressing wire $Y_k$ must have been addressed and must hold and provide a true signal. That true signal may, for example, have been developed due to a concurrent associative search under participation of, for example, cell 10–$i$+1,$k$, whereby coincidence has been established as between the state of the bistable device in cell 10–$i$+1,$k$ and the bit applied to column wire $L_{i+1}$. Therefore, amplifier 32 provides a second enabling signal to NAND gates 24 and 25, and, therefore, these two gates are prepared for a storing operation.

The two enabling and gating signals for the two gates 24 and 25 precede the providing of the bit to be stored in cell 10–$i$,$k$. The bit is again applied through input line $L_i$ to all cells in the $i$ column. As row $k$ is presumed to have been elected either line 12 or line 14 of cell 10–$i$,$k$ turns true, depending on the value of the bit held in line $L_i$. The particular NAND gate (24 or 25) turns false to operate analogous to a falling clock trigger so as to set or reset flip-flop 20, as the case may be.

ADDITIONAL MODULE FEATURES

In the foregoing the operation of and in relation to an individual storage cell was described; however, some of the elements in the module shared with other cells have already been mentioned. These were the converter 31 and amplifier 32 for the input-output operation of cells 10–$i$,$k$ and 10–$i$+1,$k$ in relation to addressing control line $Y_k$. There are the analogous converters 311, 312, 313 for lines $Y_{k+1}$, $Y_{k+2}$, $Y_{k+3}$, respectively, and there are the corresponding amplifiers 321, 322 and 323. Another element shared by several cells is inverter 18. The purpose of this inverter 18 is to limit the number of module input lines. One could provide a pair of bus lines $L_i$ and $\overline{L_i}$, but since the module is contemplated as a single IC chip, it is more convenient to limit the input lines to the chip and to provide signal conversion within the chip. There is then an analogous inverter 19 for the $i$+1th column. An intramodule data output line $\overline{D}_{i+1}$ connects likewise through an inverter 36 to the extramodule data output line $D_{i+i}$.

Finally, we turn to two inverters 33 and 34 respectively connecting line $I_i$ to line $W_i$ and line $I_{i+2}$ to line $W_{i+1}$. This permits interconnection to all W wires to a common control source (such as a single write control flip-flop) to write-enable all storage cells of a location connected to a raised Y line to the exclusion, for example, of cells which normally participate in an associative search and hold address bits not to be disturbed, or which hold data bits when a new associative address is to be written into the location.

The reason for providing inverters 33 and 34 then is to add flexibility to the system by permitting addressing of a memory location, i.e., the calling on all cells along any of the Y lines by means of an external addressing procedure, not involving associative addressing, while preventing recording into those cells not to be disturbed by the current write process, through raising of these I lines to which they are connected, so that, in fact, only some cells of a memory location will participate in the recording process by receiving new data bits.

The following additional situations are of interest and are to be discussed in some detail. Assuming, for reasons of simplification, that module 5 is a complete memory unit, then it can be seen that upon concurrently holding lines $I_i$ and $I_{i+1}$ to the false signal level, all $Y_k$, $Y_{k+1}$, $Y_{k+2}$ and $Y_{k+3}$ provide true signals, as there is nowhere a source for clamping them to the false level. If, additionally, true signals are provided to the two W lines and false signals are applied to the two data input lines $L_i$ and $L_{i+1}$, all flip-flops are being reset. In general, energization of the W wires while holding search lines I and data lines L to the false level, causes the erasing of all cells of the memory. On the other hand, selective control of the L lines in this situation permits all cells on one column to receive the same bit.

The description of the erasing process leads to the point that the associative search, as described, does not necessarily lead always to an unambiguous situation. The search criterion may have been chosen such that more than a single Y wire tends to assume a true level. Data readout would then be ambiguous or the same data would be recorded into several locations. In order to resolve such an ambiguity, a priority control system interconnects all the Y wires, as will become apparent from the description of the system shown in FIG. 2.

MEMORY ORGANIZATION

Turning now to FIG. 2, there is illustrated representatively a memory system constructed of modules of the type illustrated in FIG. 1. The modules each have 8-bit storage locations, there being accordingly, two bits per word of four different words in each module. The modules are interconnected as follows. The memory is presumed to have P locations, with $q$ bit positions per location. For the general case, $p$ and $q$ are positive integers. However, it follows from the foregoing that upon using modules of the type described, $p$=4 and $q$=2 ($m$=$n$=0) is the smallest memory using but one module; otherwise $p$ must be an integral multiple of four, and $q$ must be an even number. This, however, is not a principle restriction, but solely results from employment of a 2×4–cell module. There are, accordingly, $q$/2 times $p$/4 modules of the type shown in FIG. 1, denoted 500, 510, ..., 5$m$0, ..., 50$n$, 51$n$, ..., 5$mn$, with $n$+1 =$p$/4, and $m$+1=$q$/2, $m$ and $n$ being positive integers.

The four Y buses, $Y_0$, $Y_1$, $Y_2$ and $Y_3$ connect to output lines of the type denoted with $Y_k$, $Y_{k+1}$, etc., in FIG. 1. Connection of a storage cell to a Y-line associates the cell with a particular memory location within the associative memory system. These four Y buses $Y_0$, $Y_1$, $Y_2$ and $Y_3$ connect to the storage cells for individually addressing the four complete memory locations and as established by modules 500 through 5$m$0. There are additional Y buses in the memory system, up to bus $Y_{p11}$.

As was developed above, a true signal in a Y bus addresses the particular storage location. The addressing results normally from a successful associative search, i.e., by operation within the location itself. However, this may not always provide unambiguous addressing. Thus, the Y addressing and control wires all connect to a priority logic system 60 operating to prevent concurrent addressing of two or more memory locations. The priority control system 60 is under control of an externally developed enable signal in a line 66 connected, for example, to the processor (not shown) cooperating with the memory. An enabling signal in line 66 is more or less a timing signal for the control of the memory.

Each Y line is connected to a NOR gate such as 70, 71, 72, etc., for the lines $Y_0$, $Y_1$, $Y_2$, etc. The enabling signal from line 66 serves as gating signal for all of these NOR gates. Coupling gates 80, 81, 82, etc., provide for a connecting chain in that their outputs respectively serve as one of the inputs for the respective next gate, but gate 80 is permanently enabled. The second input of each gate 80, 81, 82, etc., is respectively provided by the output of NOR gates 70, 71, 72, etc. The outputs of gates 80, 81, 82, etc., control also buffer amplifiers 91, 92, 93, respectively, which, in turn, control the signal level in lines $Y_1$, $Y_2$, thereby establishing priority control among these addressing lines. Thus, the gate chain 80, etc., establishes a particular order of priority for the memory locations, with the one connected to line $Y_0$ having the highest priority.

Assuming that line 66 was raised and that pursuant to an associative search line $Y_0$ was raised to hold a true signal, then NOR gate 70 goes false and so goes the output of gate 80 and of all other gates, 81, 82, etc., on that chain. As a consequence, buffers 91, 92, 93, etc., clamp lines $Y_1$, $Y_2$, $Y_3$, etc., to the false signal level regardless whether or not any associative search responses of the storage cells along any of these Y lines tend to provide true signals. Thus, the memory location on line $Y_0$ is selected.

Assuming that neither line $Y_0$ nor, for example, $Y_1$, holds, or tends to hold, a true signal during an associative search, but that line $Y_2$ does. False signal levels in the lines $Y_0$ and $Y_2$ cause NOR gates 70 and 71 to continue true outputs so that gate 80 turns true and gate 81 turns true, likewise. The fact that buffer 91 provides a true signal to line $Y_1$ does not cause line $Y_1$ to go true, because the particular output circuit (or circuits) of the storage elements on line $Y_1$ which respond by a not-agree, true output of their respective output gates 21—22, (FIG. 1), hold line $Y_1$ to the false signal level. Buffer 92, however, provides a true signal in agreement with the true signal assumed to have been produced in line $Y_2$ as a consequence of associative search response of cells on that line; the location on line $Y_2$ is thus selected for response. NOR gate 72 provides a false output, so that the chain of gates, beginning with gate 82, goes false and clamps all other lines $Y_3$, etc., to the false level regardless of response of any storage elements on those lines to the associative search.

In case an enabling signal is not applied to line 66, the priority control system is, in effect, disabled. This is important, for example, for the above-defined clearing operation of the entire memory for which all of the lines $Y_0$ through $Y_{p11}$ must hold true signals. Also, it may, at times, be desirable to write particular information into more than one location. Finally, the lines $Y_0$ through $Y_{p11}$ may be coupled to an external addressing system (not shown) to address locations independently from any of the operations described here. This possibility adds flexibility to the system.

Proceeding now to the description of the various outputs and inputs for the modules, data output lines $D_0$ and $D_1$ connect to modules 500, ..., 50*n*. Modules 500, ..., 50*n* hold the first and second bit positions for all memory locations of the system, along column 0 and column 1 of the matrix. Data line $D_0$ and $D_1$ are respectively associated with these columns for receiving the two high order bits of the respectively addressed memory location. Data output lines $D_3$ and $D_4$ connect to modules 510, ..., 51*n*, etc., and data output lines $D_{q12}$ and $D_{q11}$ connect to modules 5*m*0, ..., 5*mn*. Generally, each data line connects to $n+1$ different data output lines of the $n+1$ modules along two columns, thereby connecting to $p=4$ $(n+1)$ different cells of the same column, all pertaining to the same bit position within the chosen word location format.

These data lines $D_0$ through $D_{q11}$ connect to the data-receive register of the system, or D register for short. The D register has *q*-stages; line $D_0$ connects to the first stage of the D register, line $D_1$ to the second stage, line $D_{q11}$ to the *q*th stage of the D register. Thus, it is apparent that the D register receives whatever data bits are being read out from a word memory location addressed as described above.

The various write control lines W, respectively being $W_0$, $W_1$, of modules 500, ..., 50*n*, in the first and second matrix column; $W_2$ and $W_3$ of modules 510, ..., 51*m* of the third and fourth column, etc., connect to a write control circuit 61. Circuit 61 may also be a register having *q*-stages for individually controlling the Q columns for writing. This will be the case if the inverters 33 and 34 (FIG. 1) are not provided in the individual modules, or if external addressing is not provided for. If, however, the individual modules are provided with the inverters 33 and 34, all lines $W_0$ through $W_{q11}$ are interconnected directly, circuit 61 may then be a single write control stage, which, when set, enables all write control lines $W_0$ to $W_{q11}$ to determine merely whether or not a write operation is to take place.

The associative search control lines I, which are lines $I_0$ through $I_{q11}$ in FIG. 2, are connected to the output side of the I register. The I register may have *q*-stages, unless it is certain ab initio that certain bit positions in any location of the memory system will never be used for an associative search. For conducting an associative search, the I register will receive a control word in which, for example, the individual "one" bits specify which bit positions of the associative memory will participate in the associative search and hold bits to be compared with address bits. Any "zero" bits in such a control word in the I register specify memory cells which do not participate in the associative search.

The principal aspect of the inventive system is that basically no bit position in any memory location has to be predestined by way of hard wired circuit design to hold associative search bits only. Such a restriction could be imposed for a particular application, i.e., in form of a particular circuit diagram, but the modules permit freedom of choice in that any storage cell in any word location may at times hold an associative search address bit, at other times a data bit, or the same bit may be differently interpreted merely through I pattern control.

The memory system includes an L register which is the general input register for the memory, also having *q*-stages. The outputs of the *q*-stages of the L register are connected to the L lines $L_0$ through $L_{q11}$. The inputs of the stages of the L register are coupled to a processor (not shown) of the computing system of which the associative memory is a part. The L register will receive associative search address bits, as well as data bits to be recorded. Bits held in the L register are interpreted as associative address bits where the corresponding stages of the I register hold "one" bits. The content of the other stages of the L register, where the corresponding stages of the I register hold zero bits, are interpreted as data bits in case a record operation is intended.

The I register may provide several levels of control. For example, each word location may have a particular stage, the bit position of which represents occupancy of the location. This flag bit thus defines whether or not the particular location can be written into, i.e., whether it holds data not to be erased or not to be superceded through a record or write operation, or whether this location is either empty or holds data which can be erased, or superceded by different data. Therefore, a particular type of associative search operation may simply call for a word location which, within that meaning, can be regarded as empty.

The I pattern for this lowest level type associative search will be a single "one" bit in the one stage corresponding to the bit cell in each memory location holding the flag bit, and there will be zero bits in all other stages of the I register. Assuming that a flag bit of value "zero" represents occupancy, then the corresponding bit position in the L register receives a "one" bit as search criteria for an empty location. The content of the other stages of the L register is immaterial for the associative search, but since the search for an empty location is conducted usually for purposes of a record operation, these other stages of L register hold the data to be recorded in the empty location looked for presently. These data may include data proper as well as address code bits to serve as identifying search criteria for a different level type search, expected to occur later on. The search presently described merely looks for an empty location. After an empty location has been found, the write control stage 61 will be activated and the data in the other stages of the L register will be recorded into that location.

In more detail, a recording of this type requires four phases. First, an associative search looks for an empty location. It may be assumed that the storage cells on the zero column define occupancy of the respective memory locations. The associative search to be conducted is thus defined by $I_0=1, I_1=1, I_2=\ldots=I_{q1}=0$ and $L_0=1$ ($L_1$ through $L_{q1}$ immaterial). The search for an empty cell includes a read process and the $D_0$ line, coupled to all those stages holding the occupancy flag, should be raised by this readout if there is at least one empty memory location. If there is more than one empty location, the priority control 60 will select the one of highest priority. If $D_o$ stays false, there is no empty memory location, and the record process cannot proceed normally; the processor has to decide what to do in this situation. There may be, for example, provided a specific operation which still makes a location available, even though occupied, by developing criteria permitting recording into an occupied location.

It is now presumed that certain stages of the L register hold bits, which most likely will subsequently be used as next level associative search criteria and address. If an empty location has been found, the new associative address code portion is recorded into respective cells of the empty location during the second phase of operation. Thereafter, pursuant to the third phase, the pattern in the I register is changed in that those stages corresponding to the new associative address bit positions are set; the flag bit stage is reset, the remaining stages remain reset. The L register still holds in some of its stages the new address just written into the previously selected location. The remaining stages of the L register have in the meantime received data bits proper. The zero-stage of the L register held previously the flag-search bit (a "one") representative of a search for an empty location. Having found such a location during the first phase, that flag bit is changed (resetting of the stage), to cause marking of the location found, as being occupied from now on.

A second associative search is conducted during the now ensuing third phase, using the new address code still held in the appropriate positions of the L register. The respectively associated I lines are raised and the location into which this address code has been recorded during phase 2 will be selected again. The fourth phase follows immediately as the data bits held in the L register are being recorded into the remaining stages of the addressed memory location together with the occupancy defining "zero" bit in the zero-stage of the L register, to mark the particular memory location as occupied.

It should be mentioned, that phases 2 and 4 can be combined and phase 3 can be eliminated, if the gate chain 81, 80, 82, etc., is composed of latching gates, holding the respective Y line at the true level corresponding to word level addressing beyond an associative search. A separate unlatch circuit must then be provided in order to permit another associative search to take place, after the recording process into the previously priority selected word location has been completed.

The associative memory proper is, per se, not individually addressible at all, unless external addressing is provided which is not essential in principle. Particularly, one can operate the memory in a "boot strap" fashion, as follows. Initially the line 66 is held down (no priority control), I register holds all zeros, all W lines are raised. All Y lines receive true signals and this enables all memory locations as described above. The L register may hold a word in which there is a "one" bit in stage zero corresponding to the flag stage position in each memory location. The other stages of the L register may hold zeros for clearing. Upon recording this control word into all locations they all are designated therewith as unoccupied and thus become, in fact, available for storage of data.

Then the operation proceeds as described above, beginning with a search for an unoccupied location but using the priority control system to cause selection of one location. Automatically the location of highest order priority will be selected, recorded into, marked as occupied, etc. Thus, the memory system is rendered individually addressible through control operations, using occupancy and priority control as the lowest associative search level, and once information bits are recorded, higher level associative searches can be conducted, possibly using varying associative searches can be conducted, possibly using varying associative criteria together with the priority control in case of ambiguity because more than one location meets the criterion The highest level of associative addressing is used when, with certainty, only one location can respond to the search, using, for example, the entire content of a location as search criteria merely to detect its presence or absence in the memory system.

The invention is not limited to the embodiments described above but all changes and modifications thereof not constituting departures from the spirit and scope of the invention are intended to be covered by the following claims.

I claim:

1. In an associative memory, the combination comprising:

a plurality of P ×Q storage cells defining a matrix of P rows and Q columns, with P and Q being positive integers unequal unity, each storage cell including a bistable device for storing a data bit or an associative address information bit;

an output circuit for each of the storage cells respectively connected to the bistable device therein;

a first plurality of Q addressing lines, respectively associated with the Q columns, the lines of the plurality respectively connected to the output circuits of the P cells of the respective columns, for individually receiving enabling signals indentifying an associative search operation respectively involving the cells on the respective lines of the plurality;

a second plurality of Q input lines, respectively associated with the Q columns and being respectively connected to the input of the output circuits of the P cells of the respective column, to provide search signals to the respective output circuit;

a third plurality of P addressing lines, respectively associated with the P rows and being respectively connected to the Q output circuits of the cells of the respective row;

a fourth plurality of Q output lines, being respectively associated with the Q columns, an output line of the plurality connected to the output circuits of the P cells of the respective column with which the output line is associated;

output circuits of storage cells of the plurality of cells being respectively enabled by an enabling signal in the respective line of the first plurality, and including means for energizing the respectively associated addressing line of the third plurality when a search signal in the respective input line of the second plurality coincides with the state of the bistable device in the cell, the energized addressing line of the third plurality causing at least some of the cells having output circuits on that line to apply their respective state to the output lines of the fourth plurality; and means in the output circuits connected to prevent energization of the respectively associated line of the third plurality if an output circuit connected to that line receives an enabling signal through the respectively associated line of the first plurality and pertains to a cell, the state of which does not compare with the search signal concurrently applied to the respective line of the second plurality.

2. A memory, as set forth in claim 1, wherein each storage cell includes an input circuit connected to the respectively associated addressing line of the third plurality for being enabled upon energization of the signal in that addressing line; a fifth plurality of Q input lines, each respectively connected to the input circuit of the P cells of any of said columns to provide thereto a record control signal, the input lines of the second plurality being also respectively connected to the input circuits of the respective cells to whose output circuits they are connected, to provide data bits to be recorded to those cells enabled through a signal in a line of the third plurality and upon reception of enabling signals by the respective lines of the fifth plurality.

3. A memory system, as set forth in claim 2, there being circuit means for interconnecting the lines of the first plurality with respective lines of the fifth plurality pertaining to the same column, to disable the respective line of the fifth plurality when an energization signal is received in the respectively associated line of the first plurality.

4. A memory system, as set forth in claim 2, the output circuits being constructed to respectively provide enabling signals to the lines of the third plurality in the absence of a control signal in the respective line of the first plurality.

5. A system as set forth in claim 1, and comprising circuit means interconnecting the lines of the third plurality to establish a priority sequence for response of lines of the third plurality if more than one line of the third plurality tends to energize, to prevent energization of more than one line of the third plurality.

6. A system as set forth in claim 5 including means connected for overriding the priority control to establish equal priority levels for all memory locations of the system.

7. In an associative memory circuit comprising:

a plurality of storage cells defining a storage location, and storing items of information;

an output circuit for each of the cells connected for receiving externally provided search bits and each tending to provide an enabling signal if the search bit compares with the item stored in the respective cell or if no search bit is received;

a control line connected for receiving the enabling signals if provided by the output circuits and providing an addressing signal only if all output circuits provide enabling signals; and circuit means responsive to the addressing signal to provide the content of at least some of the cells for external utilization.

8. In an associative memory circuit, as set forth in claim 7, a plurality of control lines, one for each of the output circuits, for receiving signals to determine if the respective output circuits should respond to search bits respectively concurrently applied.

9. In a circuit as set forth in claim 7, including priority control means connected for preventing effectiveness of the enabling signal if a different plurality of cells in the memory defining a storage location of higher priority and having also a control line is enabled.

10. In an associative memory, a plurality of storage cells arranged to define a matrix having rows and columns:

first means connected for individually enabling the cells along at least one column of the columns of the matrix for associative search interrogation;

second means connected for applying a search bit to the cells along said column;

third means interconnecting all cells of a row to enable the cells of the row when the cell of the row pertaining to said column holds a bit in agreement with the search bit, to provide readout of the content of at least some of the cells of the row; and means connected to the second means for positively disabling the cells of the row in the case of absence of said agreement.

11. In an associative memory as set forth in claim 10, the cells of the plurality connected to be responsive to signals individually applied to the columns of cells to control recording into those cells pertaining to the latter columns and said row.

12. In an associative memory, the combination comprising a plurality of storage cells organized in storage locations, each location having several of the cells of the plurality:

a first and a second plurality of control lines each leading to one cell per storage location;

means connected to at least some of the first lines for sequentially providing control signals to at least a first one of the first lines, and to at least a second one of the first lines;

means connected to at least some of the second lines for sequentially providing information to at least a first one of the second lines corresponding to the first one of the first lines, and to at least a second one of the second lines corresponding to the second one of the first lines, and to at least a third one of the second lines;

means in each of the storage cells to provide sequentially enabling signals for all cells of a location, when the content of a cell of that location on the first one of the first lines agrees with the information of the first one of the second lines, and when the content of a cell of that location on the second one of the first lines agrees with the information of the second one of the first lines; and means connected to at least some of the second lines for sequentially providing information to at least a first one of the second lines corresponding to the first one of the first lines, and to at least a second one of the second lines corresponding to the second one of the first lines, and to at least a third one of the second lines;

means in each of the storage cells to provide sequentially enabling signals for all cells of a location, when the content of a cell of that location on the first one of the first lines agrees with the information of the first one of the second lines, and when the content of a cell of that location on the second one of the first lines agrees with the information of the second one of the first lines; and means connected to sequentially control the cells on the second and third one of the second lines to store the information of the second and the third ones of the second lines into the cells of the location where the information of first one of the second lines agrees with the content of cell on that line, and where subsequently the content of the stored information from the second are of the second lines, agrees with the information on that latter line.

13. In an associative memory, the combination comprising:

a bistable device;

an input circuit connected to the bistable device to control the state of the bistable device and including means for receiving state controlling signals;

an output circuit connected to the bistable device to provide signals representative of the state of the bistable device;

an addressing line connected to the input and output circuits for enabling the circuits in response to a control signal in that line;

a data line for receiving bits of information, the output circuit including a control circuit connected to the data line to provide a particular signal if a data bit in the data line does not compare with the bit defined by the state of the bistable device when the output circuit is enabled;

a control line connected to the control circuit to provide thereto signals controlling permission or inhibition of the providing of the particular signal by the control circuit; and circuit means for feeding the particular signal of the control circuit to the addressing line to disable the input and output circuits, the input and output circuits being enabled in the absence of the particular signal from the control circuit.

14. The combination as set forth in claim 13 including circuit means for feeding a signal to be recorded to the input circuit to be effective for controlling the bistable device when enabled through the addressing line.

15. In an associative memory, a plurality of storage cells arranged to define a matrix having rows and columns:

first means connected for individually enabling the cells along a preselectable plurality of the columns of the matrix, for associative search interrogation;

second means connected for applying search bits to the cells along the plurality of columns;

third means interconnecting all cells of a row to enable the cells of the row when the cells of the row pertaining also to said plurality of columns hold bits in respective agreement with the search bits, to address the remaining cells of the row; and priority control means interconnecting the rows, to prevent enabling of the cells by the third means of more than one row, only the row of highest priority among those rows where all search bits and all respective cell bits agree, is being enabled by the third means.

16. In an associative memory, a plurality of storage cells arranged to define a matrix having rows and columns:

first means connected for individually enabling the cells along a preselectable plurality of the columns of the matrix, for associative search interrogation;

second means connected for applying search bits to the cells along the plurality of columns;

third means interconnecting all cells of a row to enable the cells of the row when the cells of the row pertaining also to said plurality of columns hold bits in respective agreement with the search bits, to record bits into the remaining cells of the row; and means connected to prevent recording of the search bits into said cells of the row pertaining also to the plurality of columns.

17. In a memory as set forth in claim 15, the priority control means including latching gates to enable the cells of a row beyond the period of effectiveness of the search bits as applied by the second means for operation of the third means.